(12) United States Patent
Hatta et al.

(10) Patent No.: US 10,107,169 B2
(45) Date of Patent: Oct. 23, 2018

(54) EXHAUST GAS CLEANING APPARATUS FOR INTERNAL COMBUSTION ENGINE

(71) Applicant: KABUSHIKI KAISHA TOYOTA JIDOSHOKKI, Aichi-ken (JP)

(72) Inventors: Masanori Hatta, Aichi-ken (JP); Hiroaki Ishikawa, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 73 days.

(21) Appl. No.: 15/334,737

(22) Filed: Oct. 26, 2016

(65) Prior Publication Data

US 2017/0122178 A1  May 4, 2017

(30) Foreign Application Priority Data

Oct. 28, 2015  (JP) .................................. 2015-211722

(51) Int. Cl.
*F01N 3/00* (2006.01)
*F01N 9/00* (2006.01)
(Continued)

(52) U.S. Cl.
CPC ............. *F01N 9/002* (2013.01); *F01N 3/021* (2013.01); *F01N 3/023* (2013.01); *F01N 3/025* (2013.01);
(Continued)

(58) Field of Classification Search
USPC .......... 60/274, 286, 295, 297, 301, 303, 311
See application file for complete search history.

(56) References Cited

U.S. PATENT DOCUMENTS

| 7,908,843 B2 * | 3/2011 | Doumeki ........... B01D 53/9431 60/286 |
| 9,181,831 B2 | 11/2015 | Wakamatsu et al. |

(Continued)

FOREIGN PATENT DOCUMENTS

| DE | 10 2011 004 150 | 8/2012 |
| EP | 2 525 059 | 11/2012 |

(Continued)

OTHER PUBLICATIONS

Extended European Search Report for EP 16195831.9 dated Feb. 24, 2017.

*Primary Examiner* — Binh Q Tran
(74) *Attorney, Agent, or Firm* — Greenblumm & Bernstein, P.L.C.

(57) ABSTRACT

An exhaust gas cleaning apparatus for an internal combustion engine that is mounted on a vehicle includes an exhaust passage that is connected to the internal combustion engine, a filter that collects particulate matter in exhaust gas, an $NO_x$ reducing catalyst, a dosing valve that injects urea solution into the exhaust passage, and a controller that performs a filter regeneration process in response to a request for the filter regeneration process. The filter regeneration process includes a first filter regeneration process that is performed during an idle operation of the internal combustion engine and a second filter regeneration process that is performed with the vehicle traveling. When the first filter regeneration process has been performed for a predetermined number of times without being intervened by the second filter regeneration process, the controller does not perform the first filter regeneration process even when a request for the filter regeneration process is made.

1 Claim, 2 Drawing Sheets

(51) Int. Cl.
*F01N 3/023* (2006.01)
*F01N 3/20* (2006.01)
*F01N 11/00* (2006.01)
*F01N 3/021* (2006.01)
*F01N 3/025* (2006.01)
*F01N 13/00* (2010.01)

(52) U.S. Cl.
CPC ............ *F01N 3/206* (2013.01); *F01N 3/208* (2013.01); *F01N 3/2066* (2013.01); *F01N 11/00* (2013.01); *F01N 13/009* (2014.06); *F01N 2430/085* (2013.01); *F01N 2610/02* (2013.01); *F01N 2610/1493* (2013.01); *F01N 2900/0421* (2013.01); *F01N 2900/1404* (2013.01); *F01N 2900/1606* (2013.01); *Y02A 50/2325* (2018.01); *Y02T 10/24* (2013.01); *Y02T 10/47* (2013.01)

(56) References Cited

U.S. PATENT DOCUMENTS

| | | | | |
|---|---|---|---|---|
| 9,540,985 | B2* | 1/2017 | Harmsen | F01N 3/0821 |
| 9,732,646 | B2* | 8/2017 | Upadhyay | F01N 3/0232 |
| 2009/0199537 | A1* | 8/2009 | Sisken | F01N 3/035 60/273 |
| 2011/0023455 | A1* | 2/2011 | Lee | F01N 3/105 60/274 |
| 2013/0058833 | A1 | 3/2013 | Onodera et al. | |
| 2013/0071291 | A1 | 3/2013 | Onodera et al. | |
| 2014/0331752 | A1* | 11/2014 | Hall | F01N 11/00 73/114.75 |

FOREIGN PATENT DOCUMENTS

| | | |
|---|---|---|
| EP | 2 573 342 | 3/2013 |
| EP | 2 578 831 | 4/2013 |
| EP | 2578830 | 4/2013 |
| JP | 2008-63968 | 3/2008 |
| WO | 2015/068031 | 5/2015 |

\* cited by examiner

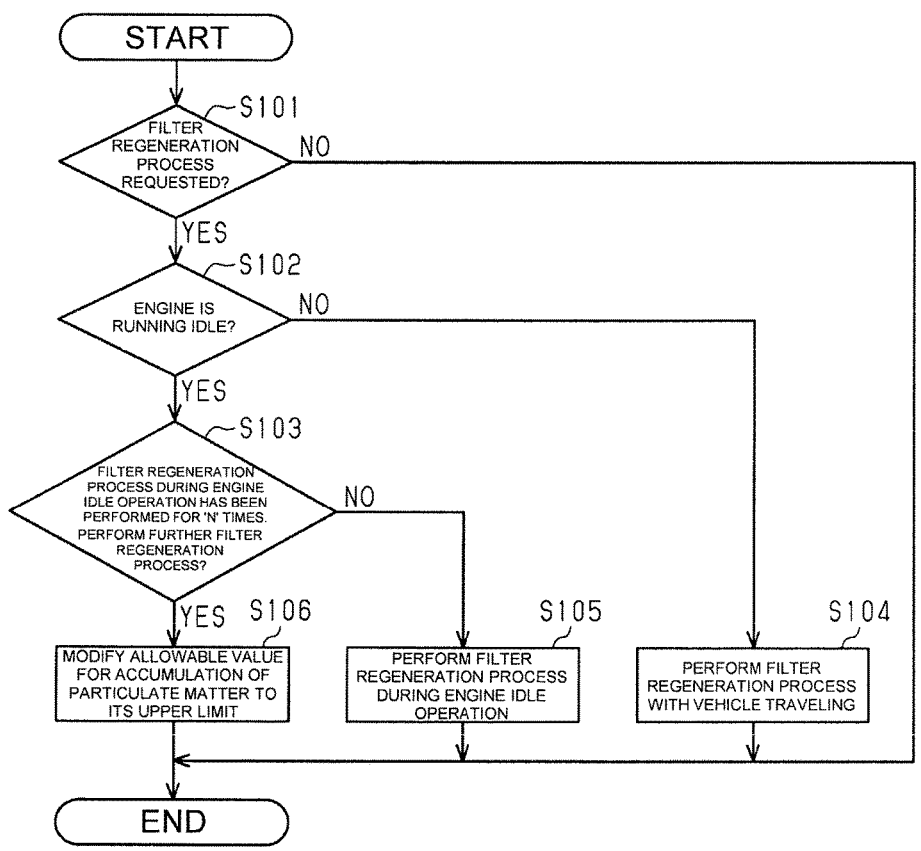

EXHAUST GAS CLEANING APPARATUS FOR INTERNAL COMBUSTION ENGINE

BACKGROUND OF THE INVENTION

The present invention relates to an exhaust gas cleaning apparatus for an internal combustion engine.

In a known apparatus for cleaning exhaust gas for an internal combustion engine mounted on a vehicle, a particulate filter for collecting particulate matter contained in exhaust gas is provided in the exhaust passage of the internal combustion engine, and a selective $NO_x$ reducing catalyst is provided downstream of the particulate filter in the exhaust passage so as to remove $NO_x$ from the exhaust gas. In such cleaning apparatus, a dosing valve is disposed downstream of the particulate filter and upstream of the $NO_x$ reducing catalyst in the exhaust passage. Urea solution is injected into the exhaust passage by the dosing valve so that the $NO_x$ reducing catalyst reduces $NO_x$ in the exhaust gas with the injected urea solution to thereby clean the exhaust gas.

Japanese Unexamined Patent Application Publication No. 2008-63968 discloses an apparatus for cleaning exhaust gas for an internal combustion engine that regenerates or cleans the particulate filter. In the cleaning apparatus, temperature of the particulate filter is raised at specified timings to thereby clean the particulate filter by eliminating the particulate matter collected in the particulate filter. As a result, the amount of the particulate matter collected in the particulate filter is prevented from increasing excessively. Such filter regeneration process is performed not only when the vehicle is traveling at a high speed and hence the temperature of the exhaust gas is high, but also when the vehicle is traveling at a low speed on a congested road. The filter regeneration process is also performed during an idle operation of the internal combustion engine, that is, when the amount of fuel combusted is small and therefore the temperature of the exhaust gas is decreased.

In the above exhaust gas cleaning apparatus, some part of the urea solution injected from the dosing valve adheres in and around the injection hole of the dosing valve. When the temperature of the dosing valve and its vicinity rises, for example, to a temperature $T1$ or higher, urea in the solution adhered in and around the injection hole of the dosing valve precipitates and the precipitated urea deposits there.

When the temperature of the dosing valve and its vicinity rises further to a temperature $T2$ (where, $T2>T1$), the urea that has deposited in and around the injection hole decomposes and disappears. The particulate filter is heated in the course of the filter regeneration process and the exhaust gas that has passed through the heated particulate filter heats the injection hole of the dosing valve and its vicinity thereof to the temperature $T2$, with the result that the urea deposits in and around the injection hole disappears by decomposition.

In decomposing and eliminating the urea that is present in and around the injection hole of the dosing valve by means of the heat of the exhaust gas that is heated in the filter regeneration process, if the filter regeneration process that is performed during an idle operation of the internal combustion engine is repeated, the urea that is present in and around the injection hole may not only be decomposed, but the deposition of the urea may rather be accelerated.

Specifically, when the internal combustion engine is running idle, the temperature of the exhaust gas is low. Therefore, in the filter regeneration process that is performed during an idle operation of the internal combustion engine, the exhaust gas may not be able to heat the injection hole of the dosing valve and its vicinity to the temperature $T2$ or higher. When the temperature of the injection hole of the dosing valve and its vicinity is the temperature $T1$ or higher but not higher than the temperature $T2$, the urea precipitates. The temperature that is equal to or higher than the temperature $T1$ but lower than the temperature $T2$ is the value at which the urea precipitates and therefore, deposition of the urea in and around the injection hole of the dosing valve is accelerated if the filter regeneration process is performed repeatedly. Accordingly, the repeated filter regeneration process during an idle operation of the internal combustion engine may accelerate the deposition of the urea in and around the injection hole of the dosing valve.

If deposition of urea occurs progressively, the injection hole of the dosing valve may be blocked and the dosing valve may not be able to inject urea solution properly, with the result that a failure may occur in the reduction of $NO_x$ by use of the $NO_x$ reducing catalyst.

In view of the above circumstances, the present invention is directed to providing an exhaust gas cleaning apparatus for an internal combustion engine that prevents urea from being deposited in and around the injection hole of the dosing valve with the filter regeneration process.

SUMMARY OF THE INVENTION

In accordance with an aspect of the present invention, there is provided an exhaust gas cleaning apparatus for an internal combustion engine mounted on a vehicle. The exhaust gas cleaning apparatus includes an exhaust passage that is connected to the internal combustion engine, a filter that is provided in the exhaust passage and collects particulate matter in exhaust gas, and an $NO_x$ reducing catalyst provided downstream of the filter in the exhaust passage. The exhaust gas cleaning apparatus further includes a dosing valve that is provided downstream of the filter and upstream of the $NO_x$ reducing catalyst in the exhaust passage and injects urea solution into the exhaust passage and a controller that performs a filter regeneration process in which the filter is heated to remove the particulate matter collected in the filter, in response to a request for the filter regeneration process. The filter regeneration process includes a first filter regeneration process that is performed during an idle operation of the internal combustion engine and a second filter regeneration process that is performed with the vehicle traveling. When the first filter regeneration process has been performed for a predetermined number of times without being intervened by the second filter regeneration process, the controller does not perform the first filter regeneration process even when a request for the filter regeneration process is made.

Other aspects and advantages of the invention will become apparent from the following description, taken in conjunction with the accompanying drawings, illustrating by way of example the principles of the invention.

BRIEF DESCRIPTION OF THE DRAWINGS

FIG. 2 is a flowchart showing a procedure for filter regeneration process according to the embodiment of the present invention.

DETAILED DESCRIPTION OF THE EMBODIMENTS

Figure 1:
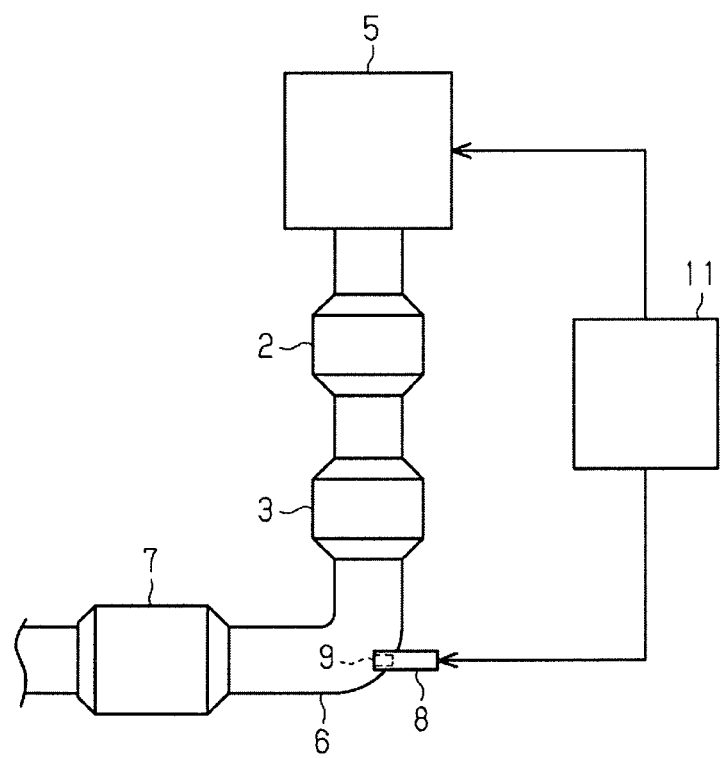
FIG. 1 is a schematic view of an exhaust gas cleaning apparatus for an internal combustion engine according to an embodiment of the present invention.

The following will describe an exhaust gas cleaning apparatus for an internal combustion engine according to an embodiment of the present invention with reference to FIGS. 1 and 2.

Referring to FIG. 1 showing an internal combustion engine 5 mounted on a vehicle (not shown) includes an exhaust passage 6. The exhaust passage 6 includes an oxidation catalyst 2, a filter 3, and an $NO_x$ reducing catalyst 7 that are arranged in this order from the upstream side of the exhaust passage 6 with respect to the exhaust gas flowing direction. The oxidation catalyst 2 cleans the exhaust gas by oxidizing carbon monoxide (CO) and hydrocarbon (HC) contained in the exhaust gas. The filter 3 collects particulate matter (PM) in the exhaust gas. As the $NO_x$ reducing catalyst 7, a selective reducing catalyst is used that reduces and cleans $NO_x$ in the exhaust gas with the aid of a urea solution. A dosing valve 8 having an injection hole 9 through which the urea solution is injected into the exhaust passage 6 is provided downstream of the filter 3 and upstream of the $NO_x$ reducing catalyst 7, or between the filter 3 and the $NO_x$ reducing catalyst 7, in the exhaust passage 6. The urea solution injected from the dosing valve 8 is flowed in the exhaust passage 6 to the $NO_x$ reducing catalyst 7 with the stream of the exhaust gas.

The vehicle on which the internal combustion engine 5 is mounted includes an electronic control unit (hereinafter, ECU) 11 that performs various control operations for the internal combustion engine 5 and also controls the driving of the dosing valve 8 based on detection signals received from various sensors that are provided to detect operating conditions of the internal combustion engine 5 and various instructions or requests from the vehicle driver. The ECU 11 also performs a filter regeneration process for removing particulate matter collected in the filter 3 by raising the temperature of the filter 3. In the filter regeneration process, the ECU 11 functions as a controller that controls the operation of the filter regeneration process.

The filter regeneration process is performed by raising the temperature of exhaust gas passing through the filter 3. In the internal combustion engine 5, a primary fuel injection is performed for the operation of the internal combustion engine 5, which is followed by a secondary fuel injection that is performed to supply fuel component to the oxidation catalyst 2 to cause oxidation and the subsequent generation of heat. The heat generated by the oxidation reaction with the oxidation catalyst 2 is used to raise the temperature of the exhaust gas flowing in the exhaust passage 6. The heated exhaust gas passing through the filter 3 heats the filter 3 to a temperature at which the particulate matter is combustible. The filter regeneration process is terminated when a predetermined condition is satisfied, for example, when the amount of particulate matter in the filter 3 is reduced below a specified value.

FIG. 2 is a flowchart showing a routine for controlling the filter regeneration process according to the present embodiment of the present invention. According to the present embodiment, the routine for the filter regeneration process is performed cyclically at specified intervals of time by the ECU 11.

First at step S101, the ECU 11 makes a determination as to whether or not there is a request for filter regeneration process. In this embodiment, the filter regeneration process is requested when the accumulated amount of particulate matter in the filter 3 has exceeded a specified threshold value. Once a filter regeneration process request has been made, the request remains effective until the conditions for terminating the filter regeneration process are satisfied and the filter regeneration process has ended, accordingly. When it is determined that a filter regeneration process request is not made (NO at S101), the ECU 11 terminates the routine for the filter regeneration process. When it is determined that a filter regeneration process request is made (YES at S101), the routine proceeds to S102.

At S102, the ECU 11 makes a determination as to whether or not the internal combustion engine 5 is running idle. When it is determined that the internal combustion engine 5 is not running idle (NO at S102), the routine proceeds to S104. At S104, the ECU 11 performs a filter regeneration process while the vehicle is traveling. The ECU 11 exits the routine when the filter regeneration process has been completed. When, on the other hand, it is determined that the internal combustion engine 5 is running idle (YES at S102), the routine proceeds to S103. At S103, the ECU 11 makes a determination as to whether or not the filter regeneration process that is performed during an idle operation of the internal combustion engine 5 has been performed successively for a predetermined number N of times without being intervened by the filter regeneration process with the vehicle traveling. It is to be noted that any appropriate number may be selected for the value N depending on the vehicle in which the exhaust gas cleaning apparatus of the present invention is used. It is also to be noted that the filter regeneration process during an idle operation of the internal combustion engine 5 and the filter regeneration process with the vehicle traveling correspond to the first filter regeneration process and the second filter regeneration process, respectively, of the present invention.

When it is determined at S103 that the filter regeneration process during an idle operation of the internal combustion engine 5 has not been performed successively for the predetermined number N of times without being intervened by the filter regeneration process with the vehicle traveling (NO at S103), the routine proceeds to S105. At S105, the ECU 11 performs a filter regeneration process during an idle operation of the internal combustion engine 5. Then, the ECU 11 terminates the routine for the filter regeneration process. Meanwhile, when it is determined at S103 that filter regeneration process during an idle operation of the internal combustion engine 5 has been performed for the predetermined number N of times without being intervened by filter regeneration process with the vehicle traveling (YES at S103), the routine proceeds to S106.

A predetermined range of allowable values representing the allowable amount of particulate matter accumulated in the filter 3 is preliminarily established. At S106, the ECU 11 modifies the currently selected allowable value to the upper limit value of the allowable range. Then, the ECU 11 terminates the routine for the filter regeneration process. The allowable value, which is used as a reference against which it is determined whether or not the amount of particulate matter accumulated in the filter 3 is excessively large or not, is variable within the specified range. When the amount of the particulate matter accumulated in the filter 3 has become the currently selected allowable value or larger, the ECU 11 turns on a warning light provided in the vehicle compartment to notify the driver of the vehicle of the abnormality of the filter 3.

The ECU 11 is configured, when it is determined as YES at S103 and the routine proceeds to S106, to disregard a request for filter regeneration process during an idle operation of the internal combustion engine 5 and disable or suspend the filter regeneration process during an idle operation of the internal combustion engine 5.

Although such disabling or suspension of the filter regeneration process during an idle operation of the internal combustion engine 5 does not affect the function of the filter 3 and the performance of the filter regeneration process itself, the amount of particulate matter accumulated in the filter 3 may increase by the disabling of the filter regeneration process, which may lead to a problem that the amount of particulate matter accumulated in the filter 3 becomes the allowable value or larger and the warning light turns on even though the filter 3 functions properly and the filter regeneration process is performed successfully.

In order to prevent the warning light from turning on undesirably, the ECU 11 modifies and raises at S106 the currently selected allowable value for the amount of the accumulated particulate matter to the upper limit of the specified range so as to prevent the amount of the particulate matter accumulated in the filter 3 from reaching the allowable value easily. As a result, it is possible to prevent the above problem that the warning light turns on undesirably even though the filter 3 functions properly and the filter regeneration process is performed successfully.

The following will describe the operation of the exhaust gas cleaning apparatus for an internal combustion engine according to the present embodiment of the present invention.

When the internal combustion engine 5 is running idle, the amount of fuel combusted is small and therefore the temperature of the exhaust gas becomes low as compared with when the vehicle is traveling. Although the injection hole 9 of the dosing valve 8 and its vicinity may be heated to the temperature T1 or higher at which the urea precipitates by the exhaust gas heat produced during the filter regeneration process, the exhaust gas heat is not high enough to raise the temperature to the temperature T2 or higher at which the urea decomposes and disappears. In this case, the urea deposits in and around the injection hole 9 of the dosing valve 8. Furthermore, if the filter regeneration process during an idle operation of the internal combustion engine 5 is performed successively without being intervened by the filter regeneration process with the vehicle traveling, the deposition of urea in and around the injection hole 9 may be accelerated.

In the exhaust gas cleaning apparatus according to the present embodiment, however, it is so controlled that the filter regeneration process during an idle operation of the internal combustion engine 5 is disabled or suspended and not performed even when there is a request for such filter regeneration process, when it is determined that filter regeneration process during an idle operation of the internal combustion engine 5 has been performed for the predetermined number N of times without being intervened by the filter regeneration process with the vehicle traveling. Therefore, deposition of urea in and around the injection hole 9 of the dosing valve 8 due to the repeated performing of the filter regeneration process during an idle operation of the internal combustion engine 5 may be prevented or retarded. Furthermore, in the exhaust gas cleaning apparatus according to the present embodiment, while the filter regeneration process during an idle operation of the internal combustion engine 5 is disabled, the filter regeneration process is performed in response to a filter regeneration process request that is made when the vehicle is traveling and, therefore, the temperature of the exhaust gas is higher than when the internal combustion engine 5 is running idle. The heat of exhaust gas produced while the filter regeneration process is performed with the vehicle traveling heats the injection hole 9 of the dosing valve 8 and its vicinity to the temperature T2 or higher that may cause decomposition of the urea deposited in and around the injection hole 9.

According to the present embodiment, the following effects are obtained.

(1) Filter regeneration process performed in the exhaust gas cleaning apparatus of the present embodiment prevents or retards the deposition of the urea in and around the injection hole 9 of the dosing valve 8.

(2) In the exhaust gas cleaning apparatus of the present embodiment, when the filter regeneration process during an idle operation of the internal combustion engine 5 is disabled, the allowable value for the accumulation of the particulate matter in the filter 3 is modified to the upper limit of the specified range. With this configuration, the warning light is prevented from turning on undesirably when the amount of particulate matter accumulated in the filter 3 is increased to the allowable value or larger while the filter regeneration process during an idle operation of the internal combustion engine 5 is disabled.

It is to be noted that the present embodiment may be modified as exemplified below:

In the routine for the filter regeneration process of FIG. 2, the step S106, that is, the modification of the current allowable value for the accumulated particulate matter in the filter 3 does not necessarily need to be performed, or S106 may be skipped.

In the filter regeneration process, the supply of the fuel component to the oxidation catalyst 2 does not necessarily need to be performed by means of the secondary fuel injection. Alternatively, a fuel dosing valve may be provided upstream of the oxidation catalyst 2 in the exhaust passage 6 to supply fuel component to the oxidation catalyst 2.

The filter 3 may be configured to have an additional function of the oxidation catalyst. In this case, the fuel supplied to the filter 3 is oxidized to generate heat for the filter 3 in the filter regeneration process. The heated filter 3 heats the exhaust gas then passing through the filter 3.

Whether or not to perform the first filter regeneration process of the present invention may be selected by the driver of the vehicle, for example, by means of a switch. In this case, the exhaust gas cleaning apparatus is configured such that, when the first filter regeneration process that is performed during an idle operation is disabled, the controller does not perform the first filter regeneration process even when the driver turns on the switch during an idle operation of the engine.

What is claimed is:

1. An exhaust gas cleaning apparatus for an internal combustion engine mounted on a vehicle, comprising:
   an exhaust passage that is connected to the internal combustion engine;
   a filter that is provided in the exhaust passage and collects particulate matter in exhaust gas;
   an NOx reducing catalyst provided downstream of the filter in the exhaust passage;
   a dosing valve that is provided downstream of the filter and upstream of the NOx reducing catalyst in the exhaust passage and injects urea solution into the exhaust passage; and
   a controller that performs a filter regeneration process in which the filter is heated to remove the particulate matter collected in the filter, in response to a request for the filter regeneration process, wherein
   the filter regeneration process includes a first filter regeneration process that is performed during an idle operation of the internal combustion engine and a second filter regeneration process that is performed when the vehicle is traveling, and when the first filter regeneration process has been performed successively for a predetermined number of times during the idle operation of the internal combustion engine without being intervened by the second filter regeneration process performed when the vehicle is traveling, the controller suspends performance of the first filter regeneration process even when a request for the first filter regeneration process is made.

\* \* \* \* \*